United States Patent
Richley et al.

(10) Patent No.: US 6,812,884 B2
(45) Date of Patent: Nov. 2, 2004

(54) TRANSCEIVER SYSTEM AND METHOD UTILIZING NANOSECOND PULSES

(75) Inventors: Edward A. Richley, Gaithersburg, MD (US); Robert J. Fontana, Potomac, MD (US)

(73) Assignee: Multispectral Solutions, Inc., Germantown, MD (US)

( * ) Notice: Subject to any disclaimer, the term of this patent is extended or adjusted under 35 U.S.C. 154(b) by 0 days.

(21) Appl. No.: 10/385,658

(22) Filed: Mar. 12, 2003

(65) Prior Publication Data

US 2004/0178947 A1 Sep. 16, 2004

(51) Int. Cl.$^7$ .......................... G01S 13/76; G01S 13/08
(52) U.S. Cl. .......................... 342/125; 342/21; 342/42; 342/46; 342/47; 342/118; 342/175
(58) Field of Search .......................... 342/21, 27, 28, 342/42–51, 82, 89–103, 118, 134–145, 175, 192–197

(56) References Cited

U.S. PATENT DOCUMENTS

| | | | | |
|---|---|---|---|---|
| 3,680,091 A | * | 7/1972 | Rutherford et al. | 342/51 |
| 3,800,440 A | * | 4/1974 | Membrino et al. | 342/169 |
| 3,801,982 A | * | 4/1974 | Richmond | 342/145 |
| 3,825,929 A | * | 7/1974 | Toman | 342/47 |
| 3,887,918 A | * | 6/1975 | Bailey et al. | 342/195 |
| 3,900,868 A | * | 8/1975 | Bock et al. | 342/48 |
| 3,979,752 A | * | 9/1976 | Charlot | 342/92 |
| 4,005,417 A | * | 1/1977 | Collins | 342/192 |
| 4,153,366 A | * | 5/1979 | Mamon et al. | 342/135 |
| 4,169,264 A | * | 9/1979 | Parker | 342/51 |
| 4,197,535 A | * | 4/1980 | Koethmann et al. | 342/195 |
| 4,242,683 A | * | 12/1980 | Cappon et al. | 342/160 |
| 4,395,712 A | * | 7/1983 | O'Hare | 342/47 |
| 4,438,435 A | * | 3/1984 | Hofgen et al. | 342/47 |
| 5,148,175 A | * | 9/1992 | Woolfolk | 342/95 |
| 5,532,701 A | * | 7/1996 | Biella | 342/47 |

* cited by examiner

*Primary Examiner*—Bernarr E. Gregory
(74) *Attorney, Agent, or Firm*—McIntyre Harbin & King (57) ABSTRACT

A transceiver for short-pulse radar applications is disclosed in which a shift register or the like is used to collect return signal information in a manner to reduce the number of transmit pulses needed and to increase the speed of determining the positions of multiple scattering objects. In addition, there is also disclosed cooperating transceivers arranged as transponders similarly utilizing shift registers or other pulse sampling techniques to accurately determine the linear distance between them based on relationships between or among propagation time, measured offsets, and internal clock skews. Corresponding methods are also disclosed.

43 Claims, 4 Drawing Sheets

Block Diagram of Complete Transceiver

Figure 1. Block Diagram of Complete Transceiver

Figure 2. Operation of High Speed Shift Register

Figure 3. Operation of Shift Registers as used for Range-Finding

Figure 4. Timing Diagram for a Range-Finding Transaction

TRANSCEIVER SYSTEM AND METHOD UTILIZING NANOSECOND PULSES

BACKGROUND OF THE INVENTION

This invention pertains to radio frequency transceivers and, in particular, to a method and a system that uses very short pulses of electromagnetic energy, e.g., an ultra wideband signal, to detect the position of one or more objects. The invention may be used in radar applications for determining the position of passively scattered objects, and also in ranging applications for determining the distance between two appropriately configured, cooperating transponder units.

Much work has been done in recent years on the use of very short pulses of radio frequency or microwave energy for radar applications. For example, McEwan (U.S. Pat. No. 5,986,600) describes a Doppler radar with an oscillator that is turned on and off by separate control signals, and with a range gating function determined by the duration of the oscillation. In another patent, McEwan (U.S. Pat. No. 6,191,724) describes a system which is based upon the use of pulse-echo techniques, and which also employs range-gating techniques in order to build up information about scattered targets at different locations. In McEwan (U.S. Pat. No. 6,137,438), the use of equivalent time techniques is described wherein many such transmit pulses are needed in order to resolve the position of a given passive target.

In each of the above examples, a transmitted pulse is utilized only for a specific, narrow range excursion (i.e., a "range bin") and requires the transmission of multiple pulses to accumulate data covering all range bins of interest.

In another set of applications, the precise location (geolocation) of a transponder is determined by time-of-flight measurements. Fontana (commonly-owned U.S. Pat. No. 6,054,950, incorporated herein), for example, describes a system wherein time-difference of-arrival measurements are made from a set of fixed transceiver at known locations. Position information is then obtained from calculations based on these measurements. Since the system is based on time-differences-of-arrival, it is necessary to have two or more transceivers at known locations in order to deduce position information for a transponder. That is, some form of infrastructure is needed to establish the position of the transponder even if only relative position information is required.

SUMMARY OF THE INVENTION

In accordance with one aspect of the present invention, there is provided a transceiver to ascertain distance of a object comprising a generator to produce a trigger signal, e.g., a clock signal, a transmitter that transmits a nanosecond pulse in response to the trigger signal, a receiver including a pulse detector to detect return signals, a shift register that samples return signals during multiple time-shifted periods, and a controller that obtains data samples from respective cells of the shift register to ascertain distance of the object based on the number of shifts from an occurrence of the trigger signal. Preferably, a system clock produces periodic trigger signals and a high-speed clock synchronized with the system clock drives the shift register.

In another embodiment, a second shift register is provided to sample time-delayed return signals and the controller obtains data samples from the second shift register to provide increased resolution of distances or times of receipt of the return signals.

In addition, the invention also includes a method of determining distance of multiple scattered objects comprising the steps of producing a trigger signal, transmitting an RF pulse in response to the trigger signal, detecting return signals produced by reflections of the RF pulse, sampling object return signals during multiple time-shifted intervals starting from an initial occurrence of the trigger signal in order produce data samples, and ascertaining the distance of multiple scattered objects based on the number of time-shifted intervals of detected pulses from the occurrence of the trigger signal. Preferably, the trigger signal is generated in the form of a clock signal, the RF pulse is a nanosecond pulse, and a high-speed clock synchronized with the clock signal effects step-wise sampling during time-shifted intervals.

In another aspect of the invention, there is provided a system to determine a distance between participating objects having cooperating transceivers, e.g., transponders, wherein the system comprises first and second transceivers respectively associated with the participating objects; each transceiver including a system clock to produce a local clock signal, a transmitter that transmits a nanosecond pulse according to the clock signal, a local receiver including a detector that detects a nanosecond pulse transmitted by the other transceiver, a local shift register that samples the presence of a nanosecond pulse during respective timing intervals defined by a high-speed clock that is synchronized with the local system clock; and the second transceiver has a controller that accesses the local shift register thereof to ascertain a first offset measurement of a first packet sent by the first transceiver; and the first transceiver has an associated controller that accesses the local shift register thereof to ascertain a second offset measurement of a second packet sent in response to receipt of the first packet by the second transceiver, wherein the second packet includes information indicative of the first offset measurement, and wherein the associated controller ascertains inter-object distance based on a relationship among offset measurements, clock skews, and propagation time. In another embodiment, the shift register is augmented with a matrix having rows indicative of data samples of the shift register observed during respective intervals defined by the system clock wherein successive rows of said matrix comprising information indicative of the first offset measurement. Further, an identification code may be included in the information.

In yet another embodiment of the invention, a method of determining distance between participating objects comprises the steps of providing first and second transceivers respectively associated with the participating objects, at the first transceiver, transmitting a nanosecond pulse according to a local clock signal; at the second transceiver, detecting the nanosecond pulse transmitted by the first transceiver, producing data samples by sampling a presence of the transmitted nanosecond pulse during respective timing intervals defined by a high-speed clock synchronized with the local clock signal, and accessing the data samples to ascertain a first offset measurement relative to a system clock signal of a first packet sent by a first transceiver; and at the first transceiver, producing data samples by sampling for a presence return signals and accessing the data samples to ascertain a second offset measurement relative to a system clock of a second packet sent in response to receipt of the first packet by the second transceiver, the second packet including information indicative of the first offset measurement, and ascertaining inter-object distance based on a relationship among offset measurements, clock skew, and propagation time. A relationship between or among other parameters may also be used to determine inter-object distance. The method may further include providing a matrix of information bits samples during multiple system clock intervals thereby to provide a way to extract payload information, such as an identification code or other information, e.g., navigation, geo-positioning, or other information to be communicated between or among participating objects.

In yet a further embodiment of the invention, there is provided a method of ascertaining distance or propagation time of a nanosecond pulse between participating objects wherein the method includes the steps of providing first and second transceivers respectively co-located with the participating objects, each transceiver having an associated pulse transmitter to transmit a nanosecond pulse, an associated detector to detect a nanosecond pulse, and an associated local shift register that samples an incoming signal the may include a nanosecond pulse sent by the other transceiver during successive shift intervals thereof; and utilizing predetermined circuit delays and position of sampled data in said shift register to ascertain distance or time of flight of a pulse between the participating objects.

Other aspects and embodiments of the invention will become apparent upon review of the succeeding description taken in conjunction with the accompanying drawings. The invention, though, is pointed out with particularity by the appended claims.

DESCRIPTION OF ILLUSTRATIVE EMBODIMENTS

The present invention circumvents limitations in both of these application areas. In radar applications, the invention eliminates the need to separately interrogate individual range bins with each transmitted pulse; while in the geolocation application, the invention provides a means for determining the linear distance between two participating or cooperating transponder units without the need for an infrastructure of previously located transceivers.

In order to make greater use of a single transmitted pulse, the receiver aspect of the present invention, in one particular embodiment, locally includes a high speed shift register (or comparable cyclic register) of such length and clock speed to time-wise record in discrete units of time the receipt of multiple, successive echo or object return pulses over an entire desired range excursion of the radar unit. The receiver's detector output is sent directly to this shift register so that when a transmitted pulse is emitted by the pulse transmitter, the shift register collects information about the return echo. Shifting terminates when the bit corresponding to the initial, directly transmitted pulse arrives at a predetermined position, e.g., the end, of the shift register. At this point, a sampled data element at each bit location in the shift register corresponds to a different object range. In this manner, a complete set of range bins is advantageously collected from a single transmitted pulse. Further pulses can be issued in order to further refine the range data in the shift register, and/or to provide a basis for rejecting noise. However, processing of data for all bins is preferably performed in parallel, so that significantly fewer pulses are needed to build information about the location of scattered targets than if one single, adjustable range bin was used to accommodate the entire range.

Such significant reduction in the required number of pulses has immediate benefit for extremely low power applications (e.g., battery-operated commercial devices), and to applications requiring a low probability of detection (e.g., for military and government systems). For low-power applications, the smaller the number of transmitted pulses per unit time, the smaller the radar's duty cycle and average transmitter power. In low probability of detection applications, a lower average transmitter power translates into a lower pulse power spectral density which is more difficult to detect, especially if spread over significant spectrum as with short pulse techniques.

Aspects of the invention may also be applied to the problem of determining the distance between two cooperating or participating transceivers. In this case, each transceiver is arranged to be an active target, or transponder, which transmits pulse and/or a coded identification signal in response to an interrogation. An exemplary range-finding process is initiated by one such transceiver sending a coded sequence of pulses and spaces at a predetermined bit rate. When received by another such unit, an array which collects an accumulation of possibly many complete cycles of the shift register will contain valid data bits, i.e., the predetermined sequence or bit pattern. When decoded, the position of the received hits in the array is noted, and represents a measure of the clock skew between the two transceivers, plus the propagation time between them. The second transceiver then sends back a data packet containing this position data, at which point the first transceiver decodes the message and notes the position in its array of newly received hits. This position represents the negative of the clock skew, plus the propagation time. Summing the two positions then gives a precise measure of twice the propagation time between the transceivers.

An alternative embodiment may be made using additional packets to account for skew drift between the two transceivers so that their respective clock frequencies do not need to be matched with high precision. The requisite high-speed data processing functions are easily implemented in programmable or custom logic parts. Current technology permits resolution on the order of nanoseconds, corresponding to positional resolutions of approximately one foot.

Devices utilizing the present invention may be useful for collision avoidance applications, or for automatic navigation of autonomous vehicles. Range-finding transponders are useful for the purpose of locating objects outfitted with such a transceiver (e.g., E-911 applications).

Transponders can be incorporated into conventional objects such as automobiles, cellular telephones, personal digital assistants, portable computers, etc., so that these objects, or a person carrying them, can be located by another similar unit. The technology thus provides a means for greatly reducing the difficulty of finding one's automobile in a large parking lot, finding a lost child in an amusement park, finding a friend in a crowded arena, finding an address on a dark street, and many other tasks related to determining the relative location of an object or target.

As evident from the present disclosure, the form of the invention may take on several forms. Examples of both a radar system and method for determining respective distances of passive objects, and a range-finding system and method for finding the distance between two substantially identical transceivers are described. Both preferably employ a high-speed shift register, or the like, to acquire input signal sampling of multiple points spaced closely in time.

Figure 1:
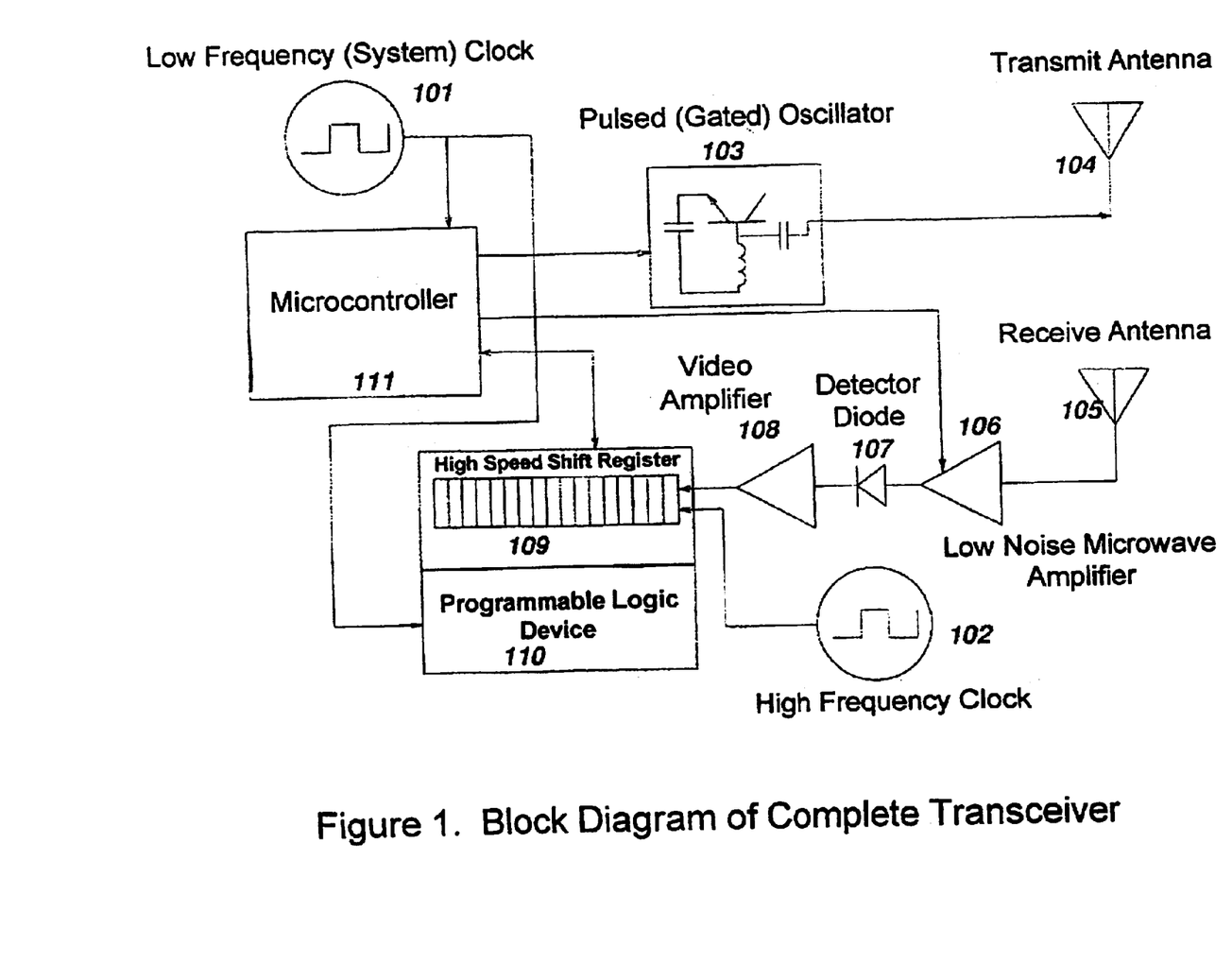
FIG. 1 shows a block diagram of a transceiver according to one aspect of the present invention. Programming of a microcontroller and logic component thereof determines whether the circuit functions for radar or range-finding applications.

Referring to the illustrative circuit of FIG. 1, transmit oscillator 103 is configured to respond to a signal from microcontroller 111 so as to emit a short pulse of radio frequency energy at the desired pulse width and center frequency (e.g., two nanoseconds at 6.5 Ghz in the illustrative embodiment) into a transmit antenna 104. Typically, such time-gated oscillator utilizes a silicon bipolar microwave transistor such as an HBFP-0405 made by Agilent Technologies, Inc. and utilizes techniques as described in Fontana et al. (U.S. Pat. No. 6,026,125) for short pulse generation.

Receive antenna 105 collects energy from this initial transmit pulse both directly when emitted by antenna 104, as well as from subsequent echo or reflected pulses obtained from scattering of the initial transmit pulse by distant objects. Signals collected by receive antenna 105 are amplified by low noise, microwave amplifier 106 and detected by detector diode 107, such as a tunnel diode detector. The baseband output of detector diode 107 is further amplified by video amplifier 108. The signal at the output of video amplifier 108 is a pulse that substantially represents the envelope of the radio frequency energy as it is received by antenna 105. This signal is then passed into high-speed shift register 109.

Shift register 109 may be implemented by either a programmable logic part, such as an MAX7000B by commercially available from Altera Corporation, or by a custom integrated circuit. The high speed shift register 109 is clocked by high speed clock 102. The frequency of clock 102 determines the spatial resolution of the radar since it determines the sampling rate of the output of video amplifier 108 by the high-speed shift register 109. In practice, frequencies of 250 MHz are readily achievable for such programmable parts for a sampling interval of four nanoseconds.

In an alternative embodiment, shift register 109 can may be further divided into two segments, with one fed driven directly from by the output of video amplifier 108, and the other fed from driven by a delayed version of that output (e.g., a two nanosecond delay). Data elements of the respective shift register segments may be interleaved with each other, provided in separate registers, or sequentially concatenated—leaving a task for the controller to segment, parse and/or utilize data in the respective registers. In this manner, a finer resolution (e.g., 2 two ns) can he achieved with the same clock rate.

In either case, the sampling rate of shift register 109 is high enough so that each hit therein, i.e., a detected pulse during a discrete time interval represented by a respective segment of the shift register, represents a delay of only a few (e.g., two to four) nanoseconds. Since radio frequency signals in air propagate at approximately one foot/ns, and since the round trip distance for a signal reflected from an object is twice the distance to the object, a shift register sampling or shifting rate of 250 MHz corresponds to a distance measurement resolution of two feet per shift register element (or one foot in the case of the use of a the above-described, time-delayed version of the video amplifier output).

Programmable logic device 110 is configured to extracts data from shift register 109 in response to commands from microcontroller 111. Note that clock 101 operates at a substantially lower frequency than clock 102, and serves as a time base for microcontroller 111 and programmable logic device 110. Clock 101 may be derived from clock 102 through the use of a frequency divider; or, conversely, clock 102 may be derived from clock 101 through the use of a phase-locked loop such as contained within the programmable oscillator ICS525 commercially available from Integrated Circuit Systems, Inc. Synchronization of clock 101 with clock 102 is not absolutely necessary for the system to operate; however, such synchronization may be useful for achieving a more reliable and predictable implementation.

Figure 2:
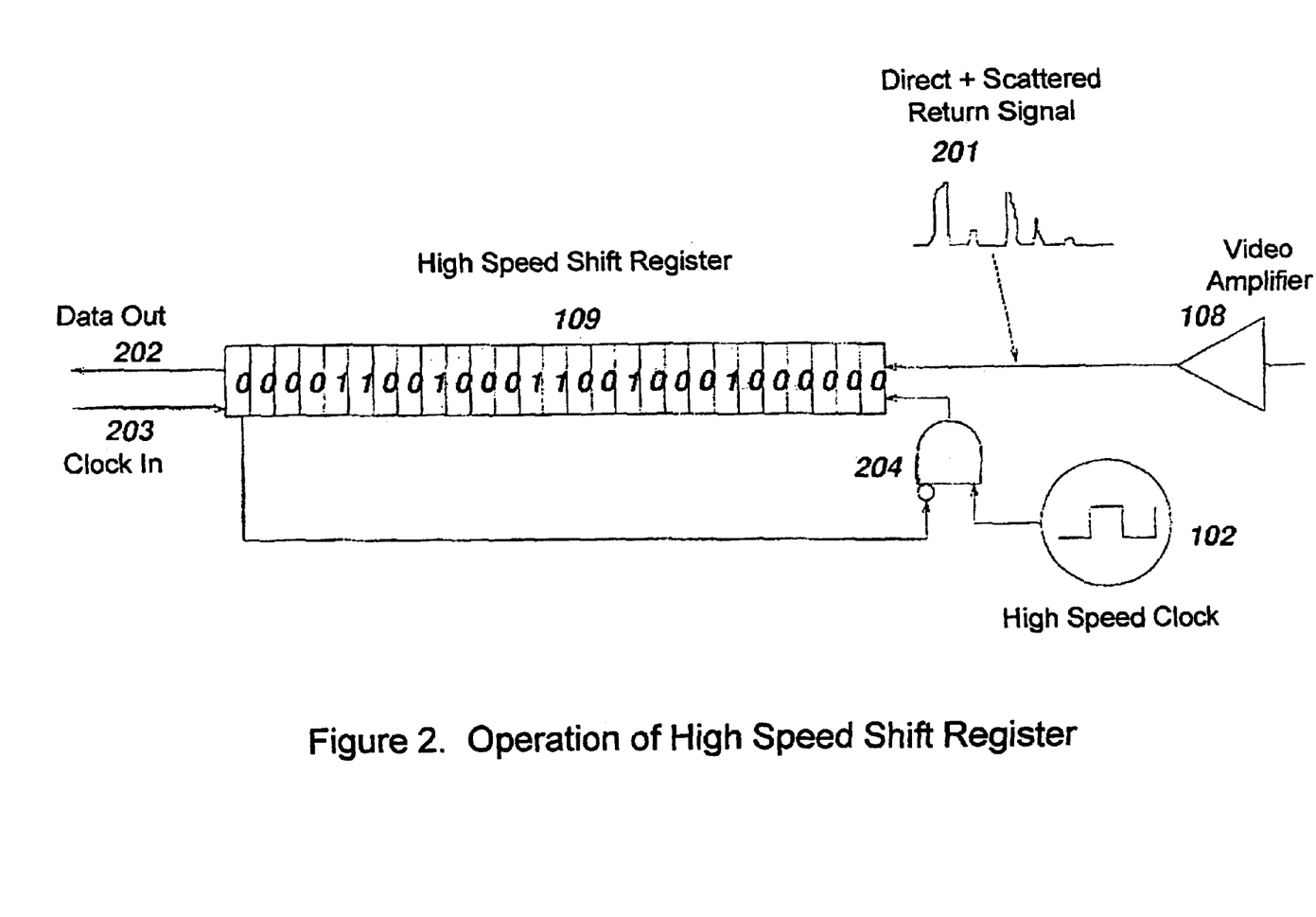
FIG. 2 illustrates operation of a high-speed shift register of FIG. 1 when receiving a pulse.

FIG. 2 shows operational details of the operation of high speed shift register 109. Input signal 201, from the output of video amplifier 108, represents the direct plus scattered signal echo pulses from produced by one transmitted pulse and typically consists a pulse directly from transmit antenna 104 (FIG. 1) followed by plus multiple a series of successive reflected return pulses associated with multiple objects. After suitable video amplification, signal 201 is fed supplied directly to the input of high speed shift register 109.

Clock 102 progressively cycles shift register 109 until the first "1" appears at the far end (left side in FIG. 2). The first "1" represents receipt by the receive antenna 105 of the initial transmit pulse from antenna 104 (FIG. 1). At this point, shifting ceases due to the shut-off action of an inhibitor gate 204, and whereupon the data then stored in shift register 109 represents, in binary digital form, the input signal 201. At this point, the data can be shifted out to microcontroller 111 at some arbitrary, lower rate via data line 202 and alternate clock line 203.

Once microcontroller 111 has recovered the data of shift register 109, the register is preferably cleared, and another transmit or trigger pulse issued to initiate another measurement or detection cycle. Software running on microcontroller 111 then processes the received data, possibly taking multiple samples so that averaging can be performed in order to suppress noise.

Further samples can be taken with amplifier 106 set to a different gain setting (cf. FIG. 1), under the control of microcontroller 111 so that some information about the magnitude of the various features in received signal 201 may also be determined. Once microcontroller 111 has processed the data, it is available for transfer to any display or host computer, which may be appropriately connected.

Determining Distance Between or Geo-Locating Participating Objects

In addition to radar applications, a system built or method carried out according to the present invention may also enable communication between two similar or substantially identical cooperating transceiver units or systems in a way to geolocate or ascertain the distance between two objects embodying such cooperating transceiver units or systems. In order to implement this function, high speed shift register 109 is preferably augmented according to FIG. 3 to include an array 301 having multiple rows, each row being indicative of a shift register sequence and where each row provides a segment of information useful for solving a set of equalities for one or more unknown values.

Figure 3:
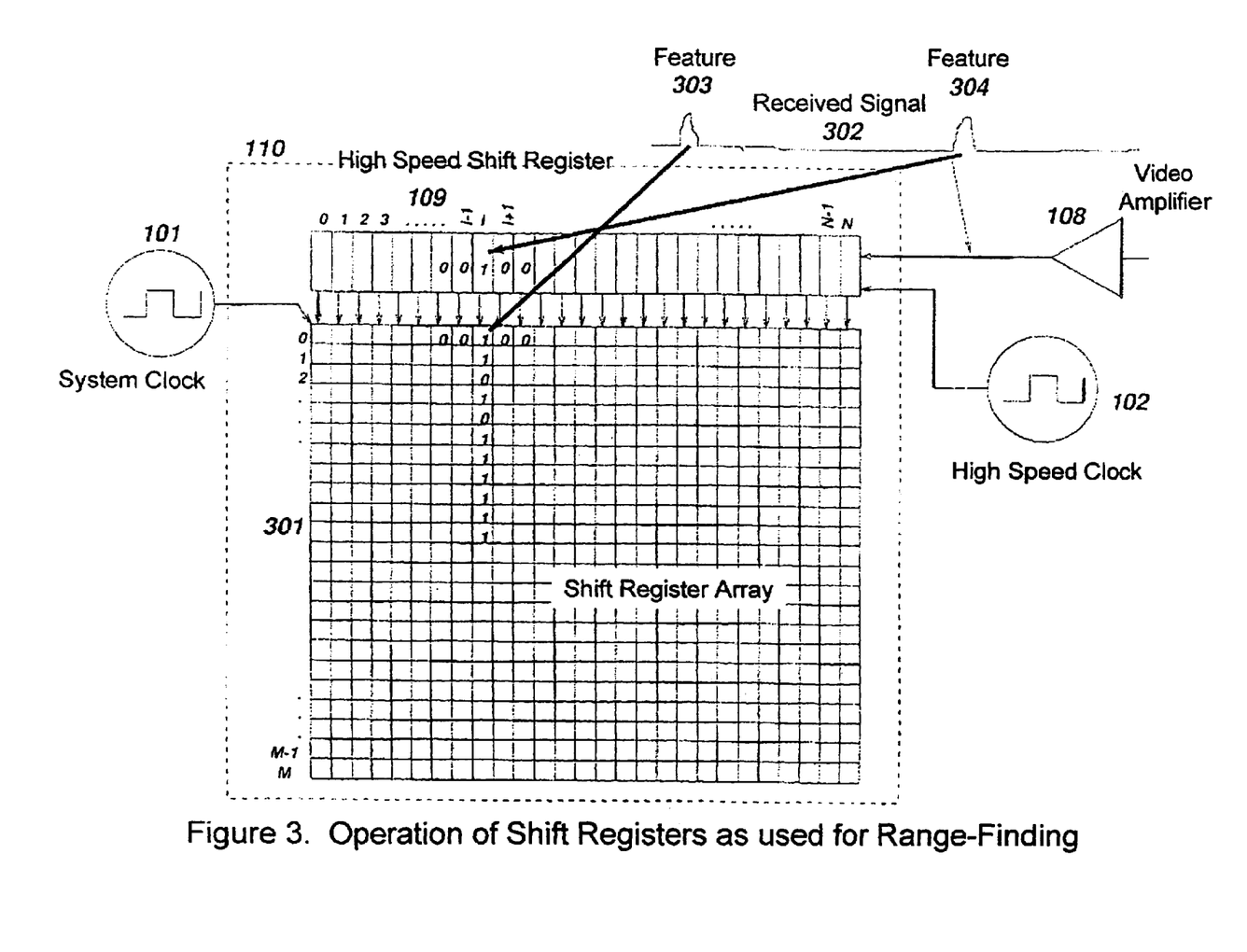
FIG. 3 illustrates a detailed operation of a shift register as it is used in range-finding applications. Data is extracted from the appropriate position of the shift register and this position is then used to determine range.

FIG. 3 illustrates how each bit of shift register 109 is fed to the input of array 301. The contents of shift register 109, when transferred to array 301, shifts vertically in the diagram, and each shift preferably occurs at the rate of system clock 101. Thus, an entire row of data from shift register 109 is loaded in parallel into a row of array 301. Array 301 is preferably implemented with programmable logic as part of programmable logic device 110. Timing information derived from the respective rows of array 301 is used, as subsequently explained, to determine inter-object range by solving a set of equations or approximated relationships for unknown values.

As previously explained, the signal incident on receive antenna 105 (FIG. 1), in this embodiment, is now the results from of a string of pulses sent by a similar or substantially identical remote transceiver unit, which pulses are sent at a data rate determined by the system clock 101 of the remote transceiver unit. Use of substantially similar or identical transceiver circuits is preferred since this facilitates an approximation of equalities or relationships to be solved when determining unknown values or distances, as described below. In the case where "unequal" circuits or circuit elements are employed, the principles of the present invention may still be practiced provided clock skews, circuit delays, etc. are known or can be closely approximated.

Thus, during each system clock cycle of a remote cooperating transceiver unit, non-zero data is ideally only received in at most one cell or element of shift register 109, and hence once per row of array 301. Signal 302 contains "features" 303 and 304 corresponding to "1" bits transmitted from the remote unit. The "1" bit represents receipt of a pulse during a shift register sampling interval, which are shown to cause a "1" to appear in subsequent rows of array 301 via shift register 109. Each "1" bit appears at column i, since the data was transmitted with a periodicity equivalent to that of system clock 101. In the example shown, a small packet of "'1's" and "0's" (missing '1') values is sent during a given number of twelve clock cycles to define a unique identification code. Also, and a small amount of data can similarly be sent in a "data pattern" of ones and zeroes. In the example of FIG. 3, the transmitted coded bit stream was "1,1,1,1,1,1,0,1,0,1,1,1, . . . ". Using a coded bit stream, respective transceivers of a selected pair of participating objects among many such objects may be identified and engaged to cooperate with each other. As clearly evident, each packet may contain multiple bits of data, depending on the details of the desired application. The receiver shown in FIG. 3 then uses conventional logic to ascertain which column "i" contains the valid data, and extracts any data contained therein. Also, the value of "i" corresponding to the appropriate column is noted to ascertain the identification code, if necessary.

Figure 4:
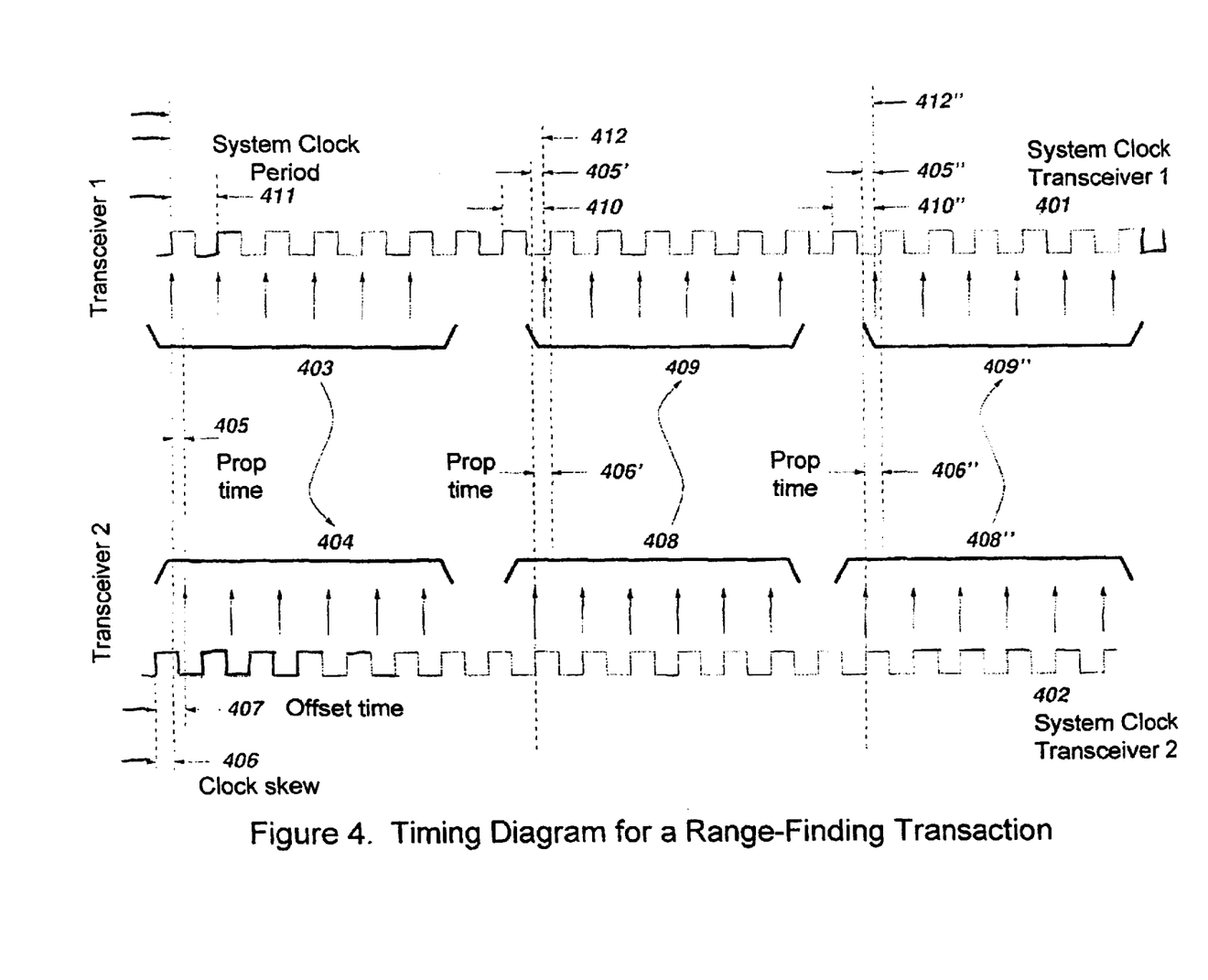
FIG. 4 shows the timing of packet receipts in a range-finding transaction. Independent, cooperating transceivers with skewed system clocks having nominally identical frequencies are corrected for skew and frequency difference by taking several measurements at different points in the data packet.

In order to compute linear distance between two participating objects embodying such similar or identical cooperating transceiver devices, an exemplary protocol based on the timing diagram of FIG. 4 is preferably used. Other protocols, as well, may be employed. With each transceiver outfitted according to FIG. 3, a data packet 403 is sent from a first transceiver (Transceiver 1) synchronously with a local system clock 401 of the first transceiver, to a second transceiver (Transceiver 2), which receives the data packet via the apparatus of FIG. 3 at a slightly later time. System clock 401 of the first transceiver, and system clock 402 of the second transceiver, both correspond to system clock 101 in each respective cooperating transceiver.

Note that, because of propagation time and circuit component differences (which may contribute to clock skew between the local system clocks of the two transceiver units), the received packet 404 at the second transceiver is not necessarily synchronous with receiver system clock 402. However, the apparatus of FIG. 3 is used to determine the offset time 407, corresponding to bit "i" in FIG. 3.

Referring to FIG. 43, note that the offset time 407 is equal to the integer i*T102 where T102 is the period of high speed clock 102. This offset time 407 is equal to the sum of the propagation time 405. (i.e., the time it takes a narrow pulse, e.g., signal a nanosecond pulse, to travel from Transceiver 1 to Transceiver 2), and any clock skew 406 between system clocks 401 and 402. Thus, $$T407 = T405 + T406 \quad (1)$$

The propagation time represents the time-of-flight between the two transceivers; and thus, when multiplied by the speed of light constant "c", gives the distance between them. However, due to the unknown clock skew T406, the propagation time T405 cannot be simply extracted from this measurement alone.

By developing a further relationship or equality, unknown propagation time T405, and thus distance, can be calculated. Thus, some time soon after packet 404 is received at cooperating Transceiver 2, the remote transceiver unit of Transceiver 2 transmits a packet 408 back to the local unit of Transceiver 1. This delay time 412 (referenced to the start of the packet at Transceiver 1) is referred to as T412. The second transmitted packet 408 experiences a propagation time T405', which is substantially identical to propagation time T405, since very little physical movement could have occurred in time T412. For example, time T412 is typically one hundred microseconds but may be somewhat less or possibly greater, depending upon the amount of data contained in packet 408. (Note that, at relative speeds of even 100 mph between participating objects, the change in position in one hundred microseconds is only 0.015 feet, which represents an additional time delay offset of only fifteen picoseconds. Thus, it can be reasonably assumed that $$T_{405'} = T_{405}.$$

Packet 408 is now received by the first transceiver as packet 409, and a similar determination of its offset "i" with respect to system clock 401 is made in order to obtain offset time $T_{410}$. From FIG. 4 it can be readily seen that offset time $T_{410}$ is the sum of the (Transceiver 1) system clock cycle time $T_{411}$, minus the skew time $T_{406'}$, plus the propagation time $T_{405'}$. That is:

$$T_{410} = T_{411} - T_{406'} + T_{405'} \quad (2)$$

The important point here is that the clock skew subtracts for the return packet transaction 408 to 409, whereas it adds for the outgoing packet transaction 403 to 404. Note, however, that the propagation time adds to the delays of both transactions.

The actual measured quantities are offset time $T_{407}$ in Transceiver 2 for the initial packet; and offset time $T_{410}$ in Transceiver 1 for the response packet. Also, the (Transceiver 1) clock cycle time $T_{411}$ is known very accurately. Furthermore, by including the measurement $T_{407}$ in the return packet information 408, the cooperating Transceiver 1 will have subsequently obtained information about that previous offset measurement result at cooperating Transceiver 2.

Thus, since the propagation times, $T_{405}$ and $T_{405'}$ are assumed to be identical, the only unknown quantities are the relative clock skews $T_{406}$ and $T_{406'}$. However, with sufficiently accurate, stable, and similar local system clocks 101 in each transceiver unit; clock signals 401 and 402 will exhibit essentially unchanging skew over the short time delay $T_{412}$ between packets 403 and 409, so that it is a simple matter to now determine the propagation time $T_{405}$. Adding the above two equations (1) and (2), $$T_{407}+T_{410}=(T_{405}+T_{405'})+(T_{406}-T_{406'})+T_{411} \quad (3)$$

$$2T_{405}+T_{411}$$

or $$T405=0.5*(T_{407}+T_{410}-T_{411}) \quad (4)$$

in terms of measured and known quantities. Hence, the distance between the two cooperating transceiver units is given by $$d=c*T_{405} \quad (5)$$

where c is the speed of light (approximately $3\times10^8$ m/s).

Note, however, that for typical, inexpensive, quartz crystal oscillators having 100 ppm (parts per million) accuracy; the assumption of constant skew may not be entirely valid. For example, for a delay $T_{412}$ of 100 microseconds, such a tolerance will give a total error of ten ns which corresponds to a positional error of approximately ten feet. This may obviously be not of sufficiently high accuracy for a system which is otherwise capable of one to two foot resolutions; and becomes increasingly worse with longer values of delay between packets. Hence, some means is necessary to improve accuracy when using low tolerance oscillators.

In order to improve accuracy, it may be necessary to take more measurements. For example, a first order correction can be applied by simply assuming that the dominant error is caused by a frequency offset between system clock signals 401 and 402. A constant frequency offset results in a skew that grows linearly with time. Thus, the skew at the second packet transmission (packet 408 to packet 409) differs from that at the first packet transmission (packet 403 to packet 404) by some amount which is proportional to the delay time $T_{412}$. That is, $$T406'-T406=\alpha T_{412} \quad (6)$$

for some proportionality constant $\alpha$.

With a non-zero skew drift, the first pair of packet transmissions (packet 403 to packet 404) and (packet 408 to packet 409) lead to the following condition:

$$T_{405} = 0.5*(T_{407} + T_{410} - T_{411} + (T_{406'} - T_{406})) \quad (7)$$

$$= 0.5*(T_{407} + T_{410} - T_{411} + \alpha T_{412}).$$

By making a third measurement, i.e. by enacting packet transmission (packet 408' to packet 409') in FIG. 4; the proportionality constant $\alpha$ can be determined. More specifically, for this third measurement:

$$T_{405} = 0.5*(T_{407} + T_{410''} - T_{411} + (T_{406''} - T_{406})) \quad (8)$$

$$= 0.5*(T_{407} + T_{410''} - T_{411} + \alpha T_{412''}).$$

At this point, the only two unknowns are the propagation time $T_{405}$ and the skew drift parameter $\alpha$. The other quantities are either measured or known. From the two equations (7) and (8) and the known measurements, it is simple to extract the skew drift parameter as:

$$\alpha = \frac{T_{410''} - T_{410}}{T_{412} - T_{412''}} \quad (9)$$

and the propagation time $T_{405}$ is determined from either of the equations:

$$T_{405} = 0.5*\left(T_{407} + T_{410''} - T_{411} + \alpha T_{412''} \frac{T_{410''} - T_{410}}{T_{412} - T_{412''}}\right) \quad (10)$$

System clock frequency error can thus be compensated to first order. Higher order corrections can also easily be implemented by making additional measurements and fitting the results to the appropriate nonlinear model for skew drift by techniques well known in the art of instrumentation.

In addition to instantaneous range determination, the invention may be extended to geolocation. Assuming one of two participating object is moving or two intercommunicating pairs of participating objects are simultaneously engaged, a relative distance measurement may be obtained at multiple positions of a moving first object relative to a fixed target or at each of multiple stationary objects relative to a fixed target. The resulting distance measurements then provide a basis for geolocating the target simply by employing conventional triangulation algorithms. Ambiguities may be resolved by providing additional distance measurements. The principles of the invention may even be extended to spatially determine relative range, direction, and azimuth in order to locate an object in free space. Equipping a first participating object with a geolocation system that ascertains true positioning, e.g,, GPS, further enables true geopositioning of a participating target.

It should be understood that based on the teachings herein numerous changes in the details of construction and the combination and arrangement of elements and materials may be resorted to without departing from the true spirit and scope of the invention as hereinafter claimed.

What is claimed is:

1. A transceiver to ascertain distance of an object, said transceiver comprising:
   a generator to produce a trigger signal,
   a transmitter that transmits a nanosecond pulse in response to said trigger signal,
   a receiver including a pulse detector to detect return signals produced by reflections of said nanosecond pulse,
   a shift register that samples return signals during multiple time-shifted intervals following an occurrence of said trigger signal, and
   a controller that obtains data samples from respective cells of said shift register and that ascertains a distance of at least one object associated with one of said samples based on a number of intervals following the occurrence of said trigger signal.

2. The transceiver of claim 1, wherein said generator comprises a system clock that produces said trigger signal in the form of a periodic clock signal, said transceiver further including a high-frequency clock synchronized with said system clock to define said intervals of said shift register during a period of said system clock.

3. The transceiver of claim 2, wherein said shift register records a data sample in a first cell thereof upon an initial occurrence of said nanosecond pulse, said shift register further including an inhibitor that halts sampling by said shift resister to enable said controller to obtain said data samples.

4. The transceiver of claim 2, wherein said receiver includes a receive antenna that receives said return signals and an adjustable amplifier disposed between the receive antenna and said pulse detector to adjust an amplification level of said return signals.

5. The transceiver of claim 2, including a second shift register that samples time-delayed return signals and said controller obtains data samples from said second shift register whereby to provide increased resolution of distances or times of receipt of said return signals.

6. A transceiver utilizing nanosecond pulses to ascertain object distance, said transceiver comprising:
   a system clock to produce a periodic clock signal,
   a transmitter that periodically transmits nanosecond pulses according to said clock signal,
   a receiver including a tunnel diode detector that detects object return signals produced by echoes of said nanosecond pulses,
   a register that samples said object return signals at discrete time intervals between successive periods of said clock signal, and
   a controller that obtains data samples from said register to ascertain object distances according to a number of discrete time intervals associated with said data samples.

7. The transceiver of claim 6, further comprising a high-speed clock synchronized with said system clock in order to effect shifting of said register.

8. The transceiver of claim 7, wherein said controller utilizes a time base of said high-speed clock and a number of shifts of a data sample in said register to ascertain an object distance associated with said data sample.

9. A method of determining distance of multiple scattered objects comprising:
   producing a trigger signal,
   transmitting an RF pulse in response to said trigger signal,
   detecting return signals produced by reflections of said RF pulse from said objects,
   sampling return signals during respective ones of multiple time intervals following an initial occurrence of said trigger signal thereby to produce respective data samples associated with respective ones of said objects, and
   ascertaining distance of respective ones of said objects based on an associated number of time intervals following said initial occurrence.

10. The method of claim 9 wherein said trigger signal comprises a periodic clock signal and said sampling step occurs during intervals of said clock signal defined by a high-frequency clock.

11. The method of claim 10 further including, during said sampling step, recording a data sample upon initial occurrence of said RF pulse, and said ascertaining step occurs at a sampling interval defined by the initial transmission.

12. The method of claim 10 further including, prior to said detecting step, amplifying return signals of said RF pulse.

13. The method of claim 10, wherein said sampling step includes sampling a delayed representation of said return signals and said ascertaining step utilizes said sampled data and said delayed representation to determine distance.

14. A method of ascertaining distance of an object comprising:
   providing a system clock to produce a periodic clock signal,
   transmitting a nanosecond pulse according to said clock signal,
   detecting an object return signal produced by an echo of said nanosecond pulse,
   registering an occurrence of an object return signal during at least one of multiple discrete time intervals within a period of said clock signal, and
   ascertaining distance by obtaining data samples produced by said registering step thereby to ascertain an object distance associated with the interval of occurrence of said return signal.

15. The method of claim 14, further including the step of providing a high-speed clock synchronized with said system clock to effect said registering during said discrete time intervals.

16. The method of claim 15, wherein said ascertaining step utilizes a time base of said high-speed clock and a number of shifts during said registering to ascertain an object distance associated with said return signal.

17. A system to determine a distance between participating objects having cooperating transceivers, said system comprising:
   first and second transceivers respectively associated with the participating objects;
   each transceiver including a system clock to produce a local clock signal, a transmitter that transmits a nanosecond pulse according to the clock signals, a local receiver including a detector that detects a nanosecond pulse transmitted by the other transceiver, a local shift register that samples presence of a nanosecond pulse during respective timing intervals defined by a high-speed clock, said high-speed clock being synchronized with the local system clock; and
   the second transceiver having a controller that accesses the local shift register thereof to ascertain a first offset measurement of a first packet sent by the first transceiver;
   the first transceiver having an associated controller that accesses the local shift register thereof to ascertain a second offset measurement of a second packet sent in response to receipt of the first packet by the second transceiver, said second packet including information indicative of the first offset measurement, said associated controller ascertaining inter-object distance based on a relationship among said offset measurements, clock skew, and propagation time.

18. A system to determine distance between two objects, said system comprising:
   first and second transceivers respectively associated with the objects;
   each transceiver including a transmitter that transmits an RF pulse, a detector that detects an RF pulse transmitted by the other transceiver, a register that registers a time instance of receipt of an incoming RF pulse; and
   a second controller of the second transceiver that accesses the register thereof to ascertain a first offset measurement of a first packet sent by the first transceiver; and
   a first controller of the first transceiver that accesses the register thereof to ascertain a second offset measurement of a second packet sent by the second transceiver in response to the first packet, said second packet including information indicative of the first offset measurement, said fist controller determining inter-object distance based on said offset measurements, clock skew information, and propagation time.

19. The system of claim 18, wherein a trigger signal effects emission of said RF pulse and said offset measurement is made in relation to said trigger signal.

20. The system of claim 18, wherein each transceiver includes a system clock to periodically effect transmission of said RF pulse and a high-speed clock synchronized with said system clock to effect step-wise sampling by said register of a signal including an incoming RF pulse.

21. The system of claim 20, wherein said RF pulse comprises a nanosecond pulse.

22. The system of claim 21, wherein said detector comprises a tunnel diode detector.

23. The system of claim 20, wherein said register comprises a shift register and said system further includes a matrix having rows indicative of data samples of said shift register observed during an interval defined by said system clock, respective rows of said matrix comprising information indicative of the first offset measurement.

24. The system of claim 23, wherein rows of said matrix include data samples representative of an identification code comprising a pattern of ones and zeroes.

25. The system of claim 20, wherein said register comprises a matrix having rows indicative of data samples observed during respective intervals of said system clock wherein respective rows of said matrix represent a unit of information sent by one transceiver to the other transceiver.

26. The system of claim 18, wherein said register includes a matrix having rows indicative of data samples observed during an interval following transmission of said RF pulse.

27. A transceiver system to ascertain a distance between participating objects, said system comprising:
    first and second transceivers respectively co-located with said participating objects, each transceiver having an associated pulse transmitter to transmit a nanosecond pulse, an associated detector to detect a nanosecond pulse, and an associated local shift register that samples an incoming nanosecond pulse sent by the other transceiver during successive shift intervals thereof; and
    a controller associated with at least one transceiver that utilizes predetermined circuit delays and positions of sampled data in said shift register to ascertain time of flight of a pulse between said objects whereby to ascertain said distance between participating objects according to said time of flight.

28. The system of claim 27, further including a matrix that records in respective rows thereof contents of said shift register obtained during respective sampling interval.

29. The system of claim 28, wherein data sampled during a given sampling interval of each row of said matrix indicates transmitted information.

30. The system of claim 29, wherein said transmitted information comprises an identification code.

31. A method of determining distance between participating objects, said method comprising:
    providing first and second transceivers respectively associated with the participating objects;
    at the first transceiver, transmitting a nanosecond pulse according to a local clock signal;
    at the second transceiver, detecting the nanosecond pulse transmitted by the first transceiver, producing data samples by sampling a presence of the transmitted nanosecond pulse during respective timing intervals defined by a high-speed clock synchronized with the local clock signal, and accessing said data samples to ascertain a first offset measurement relative to a system clock signal of a first packet sent by a first transceiver; and
    at the first transceiver, producing data samples by sampling a presence of the transmitted return data and accessing said data samples to ascertain a second offset measurement relative to a system clock signal of a second packet sent in response to receipt of the first packet by the second transceiver, said second packet including information indicative of the first offset measurement, and ascertaining inter-object distance based on a relationship among said offset measurements, clock skew, and propagation time.

32. A method of determining distance between two objects based on propagation time of an RF pulse traveling between said objects, said method comprising:
    providing first and second transceivers respectively associated with the objects, each transceiver having an associated system clock and clock skew;
    transmitting the RF pulse from a first transceiver, detecting the RF pulse at the second transceiver, and registering at the second transceiver a time instance of receipt of the RF pulse relative to a system clock, and accessing a first offset measurement of a first packet sent by the first transceiver according to said time instance; and
    at said first transceiver, registering relative to a system clock receipt of a second packet sent by the second transceiver in response to the first packet thereby to ascertain a second offset measurement, said second packet including information indicative of the first offset measurement, and determining inter-object distance based on said offset measurements, clock skews, and propagation time.

33. The method of claim 32, wherein the system clock of one transceiver periodically effects transmission of said RF pulse and each transceiver includes a high-speed clock synchronized with a system clock thereof to effect step-wise sampling of a signal including an incoming RF pulse during said registering step of each transceiver.

34. The method of claim 33, wherein said RF pulse comprises a nanosecond pulse.

35. The method of claim 34, wherein said detector comprises a tunnel diode detector.

36. The method of claim 33, further including the step of providing a matrix having rows indicative of data samples observed during an interval defined by said system clock, said data samples representing information indicative of the first offset measurement.

37. The method of claim 33, wherein said register includes a matrix having rows indicative of data samples observed during an interval following transmission of said RF pulse.

38. The method of claim 33, wherein rows of said matrix include data samples representative of an identification code comprising a pattern of ones and zeroes.

39. The method of claim 33, wherein said registering includes providing a matrix having rows indicative of data samples observed during an interval defined by said system clock wherein rows of said matrix include data samples representative of information sent by one transceiver to the other transceiver.

40. A method of ascertaining distance or propagation time of a nanosecond pulse between participating objects, said method comprising:
    providing first and second transceivers respectively co-located with the participating objects, each transceiver having an associated pulse transmitter to transmit a nanosecond pulse, an associated detector to detect a nanosecond pulse, and an associated local shift register that samples an incoming signal to detect a nanosecond pulse sent by the other transceiver during successive shift intervals thereof; and utilizing predetermined circuit delays and position of sampled data in said shift register to ascertain time of flight of a pulse whereby to ascertain distance between said objects.

41. The method of claim 40, further including recording in respective rows of a matrix the contents of said shift register obtained during respective sampling intervals.

42. The method of claim 41, wherein data sampled during a given sampling interval of each row of said matrix indicates transmitted information.

43. The method of claim 42, wherein said transmitted information comprises an identification code.

* * * * *